June 12, 1923. Re. 15,626
J. PLONKA
CONVEYER FOR SHEET MATERIAL
Original Filed March 14, 1922 3 Sheets-Sheet 1
FIG. I
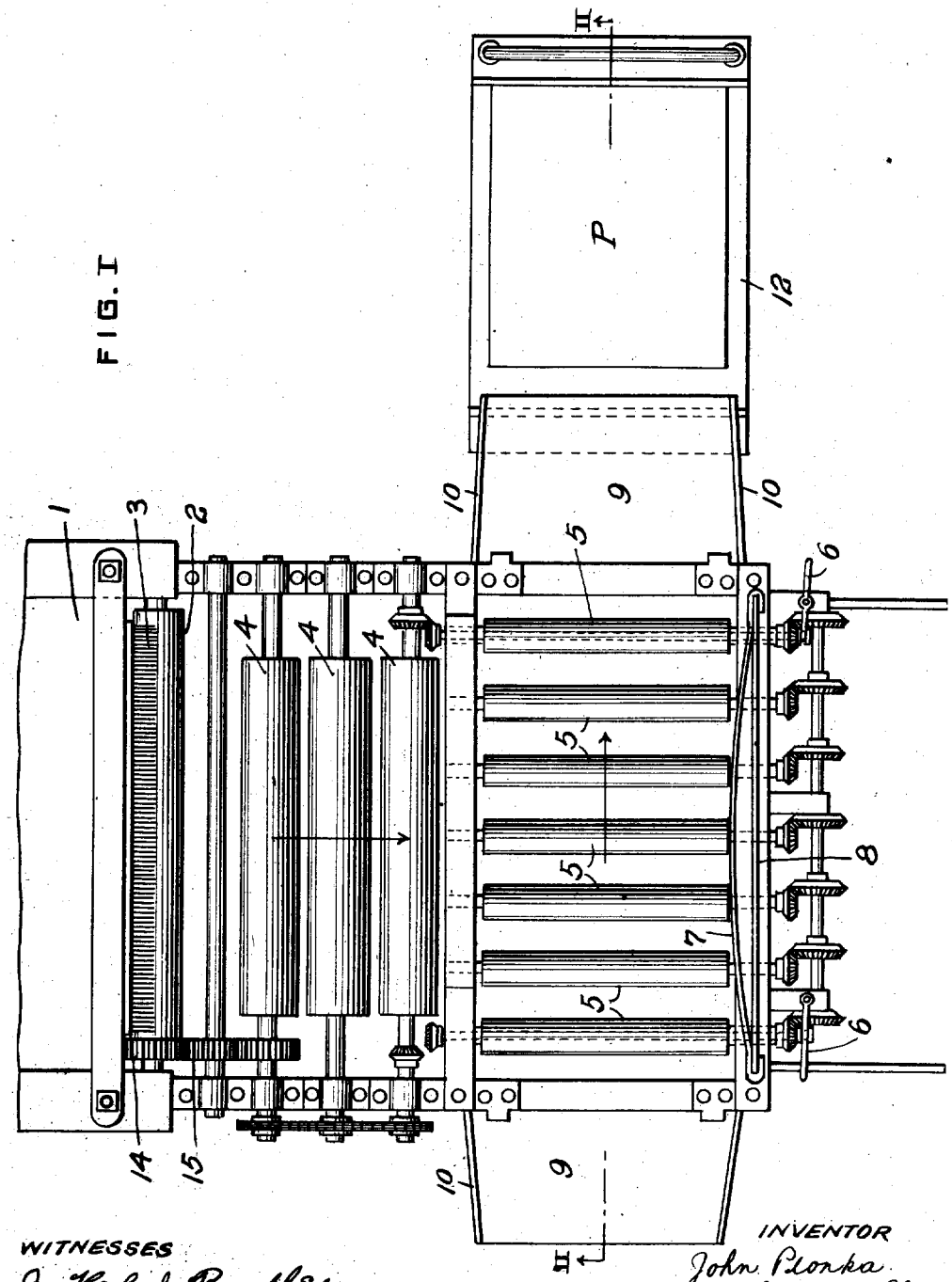
WITNESSES
J. Hebel Bradley.
Percy A. English.
INVENTOR
John Plonka
Per Christy and Christy
his attorneys June 12, 1923. Re. 15,626
J. PLONKA
CONVEYER FOR SHEET MATERIAL
Original Filed March 14, 1922 3 Sheets-Sheet 2
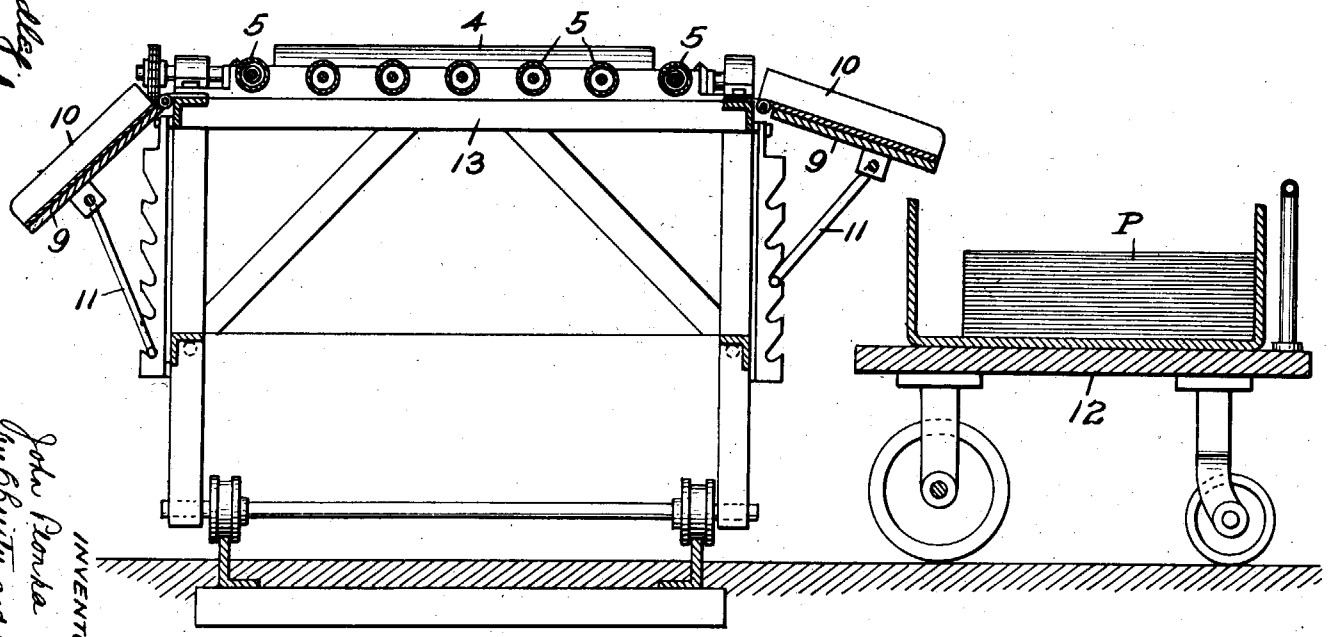
FIG. II.
WITNESSES
J. Hebel Bradley
Percy A. English
INVENTOR
John Plonka
by Christy and Christy
his attorneys June 12, 1923.
Re. 15,626
J. PLONKA
CONVEYER FOR SHEET MATERIAL
Original Filed March 14. 1922 3 Sheets-Sheet 3
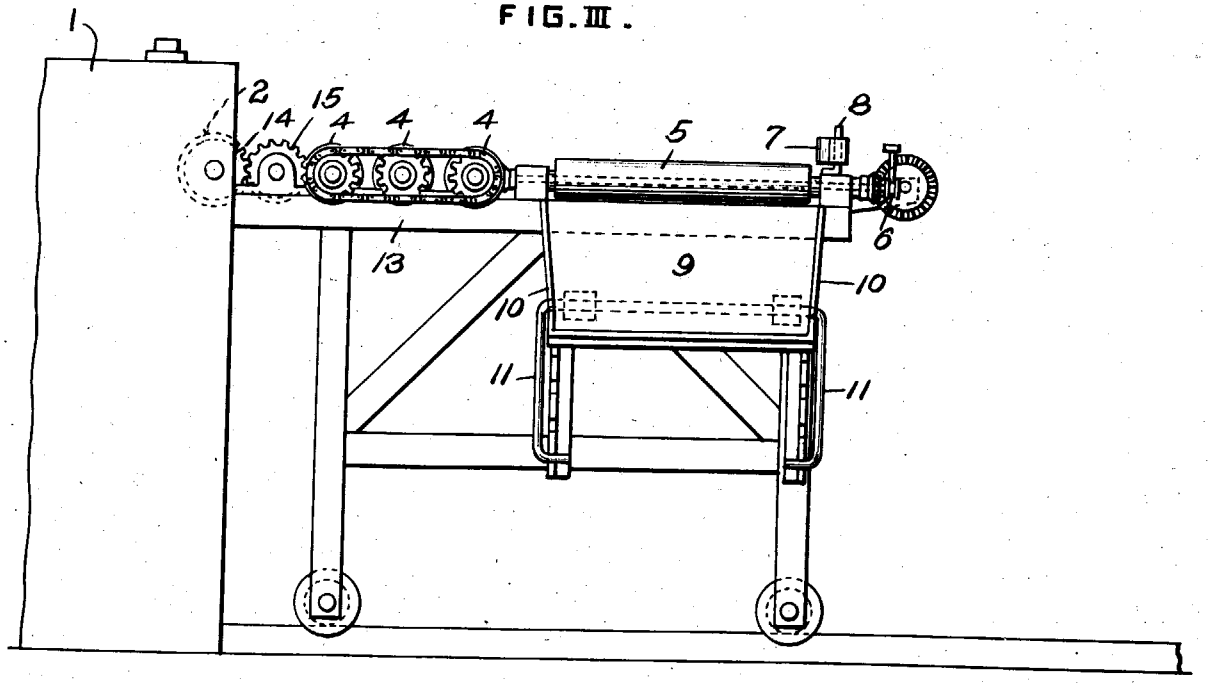
FIG. III.
WITNESSES
J. Hekah Bradley.
Percy C. English.
INVENTOR
John Plonka
by Christy and Christy
his attorneys Reissued June 12, 1923. Re. 15,626

UNITED STATES PATENT OFFICE.

JOHN PLONKA, OF WOODLAWN, PENNSYLVANIA.

CONVEYER FOR SHEET MATERIAL.

Original No. 1,432,086, dated October 17, 1922, Serial No. 543,550, filed March 14, 1922. Application for reissue filed May 2, 1923. Serial No. 636,259.

*To all whom it may concern:*

Be it known that I, JOHN PLONKA, residing at Woodlawn, in the county of Beaver and State of Pennsylvania, citizen of the Republic of Poland, have invented or discovered certain new and useful Improvements in Conveyers for Sheet Material, of which improvements the following is a specification.

My invention relates to improvements in conveyers, and finds particular application in conveyers leading from the branning machine of a tin-plate mill. Its object is to carry the plates one by one from the branning machine and to stack them automatically upon buggies. Hitherto it has been necessary to gather by hand the plates as they lie superposed in irregular manner on the delivery side of the branning machine. An attendant grasps by opposite edges a handful of the plates and turning them to vertical position and holding them loosely, he drops them on edge upon a suitable surface, thus stacking them after the manner of a pack of cards. It is an undesirable expense, to pay for a workman here; and, besides there is of necessity, incidental to an irregular delivery, with plates falling one upon another in a haphazard manner, and incidental to manual stacking of the irregularly superposed plates, and to the dragging about, a very appreciable element of damage. And this it is desirable if possible to prevent.

A conveyer embodying my invention is illustrated in the accompanying drawings. Fig. I is a plan view from above; Fig. II is a view in vertical section, on the plane indicated by the line II—II, Fig. I. Fig. III is a view in side elevation.

Referring first to Fig. I a branning machine appears in fragmentary showing at 1. Plates are delivered from this branning machine over rollers 2 and under brush 3 and upon a conveyer, which as here shown includes three horizontally extending parallel rollers 4, of which the first and third are "live,"—that is to say, positively rotated—while the intermediate roller, though in the drawings shown to be a live roller, may be an idle roller. The conveying apparatus thus far identified is old and commonly used in the art. From the rollers 4 the plates are commonly delivered to some sort of a bin or platform, and there they collect in an irregular pile, and it is with the pile so accumulated that the attendant has to do, after the manner indicated above. It will be understood that the branning machine includes mechanism for effecting advance of plates under treatment through it, and that the delivery roller 2, and indeed, the conveyer rollers 4 as well, constitute part of that mechanism.

My invention is found in conveyer apparatus arranged to receive the plates as they advance one by one from rolls 4, and, receiving them, to convey them and stack them automatically in a buggy or on another suitable support. This conveying apparatus includes, combined with delivery mechanism such as that described or its equivalent, a live transfer table and a bumper spring. With these a chute or chutes will ordinarily be correlated in the manner shown. The live table is made up of a plurality of parallel rollers 5, in this case seven, although the number is relatively unimportant. It lies across the delivery end of the conveyer made up of rollers 4. These rollers 5 lie perpendicularly to rollers 4 and in a somewhat lower plane. As conveyer elements they have by virtue of their position and their rotation two characteristics: They serve as skids upon which plates advancing from rollers 4 slide, until the previously acquired momentum be expended; and they serve also to impel the plates in a new direction, a direction at right angles to that imparted by the branning machine and its immediately associated conveying mechanism. Rollers 5 are, as will be perceived, geared together, to rotate in unison, and driving connection may through clutch mechanism 6 be established at will with either one end or the other of the axle of the positively driven proximate roll 4, and so rollers 5 may be rotated to carry the material either to the right or to the left, and in a direction at right angles to the direction of advance from the branning machine.

At the opposite end of rollers 5, remote from rollers 4, is arranged a spring 7. This spring conveniently takes the form of a heavy leaf or band, bowed toward the advancing plate, and anchored at its ends by being folded about the opposite margins of a rigid plate 8, the fold being such as to admit of play and yet securing the spring from displacement.

At opposite ends of the transfer table made up of live rollers 5 are arranged inclined chutes 9 with convergent side plates 10. Provision is conveniently made for swinging these chutes to increase or decrease as need may be the degree of inclination and to direct the line of delivery as need may be. Such provision is illustrated in Fig. II, where the chutes are shown to be pivoted at their ends adjacent the transfer table, and to be supported by adjustable braces 11.

Fig. II shows a buggy 12 wheeled to position opposite the delivery chute at the right hand side, and a stack P of plates resting upon it. From what has gone before it will be understood that this drawing shows the accurately formed stack which it is the end and aim of my invention automatically to achieve.

Fig. III shows a convenient assembly, with the delivery rolls 4 of the branning machine, together with the transfer mechanism of my invention, mounted on a movable carriage 13. By this arrangement the whole assembly may be removed for purposes of repair and to give free and ready access to the branning machine. In this connection it will be observed that the delivery roller 2 is shown to be a permanent part of the branning machine, and that it is provided with a spur gear 14 which when the carriage 13 is brought to place meshes with a gear 15 mounted on carriage 13, and through which the proximate roller 4 is driven. By these instrumentalities, together with the sprockets and gears shown, the whole conveying apparatus may be driven.

Operation is as follows. When the branning machine is in service the mechanism for effecting advance of plates through it is in operation and as part of that mechanism roller 2 is turning. Carriage 13 being in place, the transfer table consisting of rollers 4 is active and in condition to carry material in the direction indicated by the arrow, Fig. I. Clutches 6 are so set that the second transfer table, made up of rollers 5, is active also, and effective to carry material in this case to the right in the direction indicated by a second arrow. Chute 9 on the right is properly adjusted, to deliver plates to the buggy 12, brought to proper position on the right.

The plates as they emerge from the branning machine invariably lie somewhat askew from the line of travel. This is a condition incident to manipulation, and it is difficult to conceive any way of carrying the plates through the branning machine and subjecting them freely to the branning operation and yet bringing them out of the branning machine squared exactly to the line of advance. As conditions now are, there is a haphazard element in the positioning of the plates, and this haphazard element is really the cause of prior difficulty in properly stacking the successively delivered plates.

Considering the individual plate, it lies upon rollers 4 in an indeterminate and usually irregular position and in response to the turning of the live rollers 4 it advances over and passes from rollers 4. As it advances it comes to bearing upon rollers 5 and slides under the momentum which it then possesses longitudinally upon rollers 5. The inferior position of rollers 5 facilitates such advance. The rotating rollers 5 tend to turn the plate as it so slides, but this signifies not at all. The plate is advancing with such momentum that it slides across the table formed by rollers 5 and strikes upon spring 7. Spring 7 performs a double function: it rights the plate in its position, and it absorbs the momentum, and it throws the plate back upon rollers 5 in substantially squared position.

When the plate has so recoiled from spring 7 it lies upon rollers 5 free of contact with the spring, aligned with the direction of further travel, or substantially so, and substantially centered in the path of further travel, and entirely passive to the operation of rollers 5. They alone are now effective. Rollers 5 carry the plate to the right, with measured speed, and impart to it a measured momentum. The plate enters chute 9 on a substantially centered course. Any minor misplacement is corrected by the convergent side walls of the chute, and from the chute the plate advances accurately directed and under momentum sufficiently regulated, so that the successively delivered plates come automatically to position with substantial accuracy, to form a regularly built stack P.

The advantage of the alternately directed delivery of the apparatus, to the right hand or to the left, lies in this: that without intermission of delivery a full buggy may be removed and replaced while another buggy is receiving a load.

A further advantage will be perceived in arranging the transfer table composed of rollers 5 at lower level than that composed of rollers 4. (In the machine I have built and now have in operation the interval is two inches.) If on any account it be desired, delivery may be interrupted for a few minutes without interrupting the operation of the branning machine. The hitherto active clutch 6 may be opened without closing the other clutch. Rollers 5 will then stop. Delivery from the branning machine will continue and the successively advancing plates will merely stack themselves upon the second transfer table (that made up of rollers 5) until, the cause of interruption being attended to, one or the other of clutches 6 is closed, and the material stacked on the transfer table is delivered in like manner as a single sheet.

The practice of my invention saves time, for there is no need to stop the branning machine because of conditions of delivery; and, as I have already explained, the cost and wastage incident to manual dragging and stacking of the delivered plates are avoided.

I claim as my invention:

1. Conveyer apparatus for sheet material including two transfer tables, each consisting of positively driven rollers, the two tables being arranged angularly the one to the other, the second table lying beyond and extending across the delivery end of the first, and a spring arranged on the side of the second table remote from the delivery end of the first table whereby the advancing sheet rebounding from the spring lies upon the rollers of the second table squared to its new direction of travel substantially as described.

2. Conveyer apparatus for sheet material including two transfer tables, each consisting of positively driven rollers, the two tables being arranged angularly the one to the other, the second table arranged at a lower level than the first and lying beyond and extending across the delivery end of the first, its component rollers affording a skidway to material advancing from the first, and a strap spring arranged at the side of the second table remote from the delivery end of the first table and bowed towards the first table, substantially as described.

3. Conveyer apparatus for sheet material including two transfer tables, each consisting of positively driven rollers, the two tables being arranged angularly the one to the other, the second table lying beyond and extending across the delivery end of the first, the ultimate roller of the first table being provided at its opposite ends with oppositely disposed beveled gears and the train of rollers which constitutes the second table being provided with beveled gears adapted to intermesh alternately with one or the other of the two said beveled gears upon the ultimate roller of the first table, and means for shifting the said beveled gears of the second table, substantially as described.

4. Conveyer apparatus for sheet material including two transfer tables, each consisting of positively driven rollers, the two tables being arranged angularly the one to the other, the second table lying beyond and extending across the delivery end of the first, its component rollers affording a skidway to material advancing from the first, and an abutment arranged on the side of the second table remote from the delivery end of the first table and affording an increasing resistance to a sheet advancing from the first table across the second.

In testimony whereof I have hereunto set my hand.

JOHN PLONKA.

Witnesses:
JOHN M. THORNE,
C. W. HERBSTER.